US009390133B2

(12) United States Patent
Heath (10) Patent No.: US 9,390,133 B2
(45) Date of Patent: Jul. 12, 2016

(54) METHOD AND SYSTEM FOR REGULATING ENTRY OF DATA INTO A PROTECTED SYSTEM

(75) Inventor: Chester Heath, Boca Raton, FL (US)

(73) Assignees: The Quantum Group, Inc., Lake Worth, FL (US); Noel J. Guillama, Wellington, FL (US)

( * ) Notice: Subject to any disclaimer, the term of this patent is extended or adjusted under 35 U.S.C. 154(b) by 1060 days.

(21) Appl. No.: 12/410,811

(22) Filed: Mar. 25, 2009

(65) Prior Publication Data
US 2010/0250762 A1    Sep. 30, 2010

(51) Int. Cl.
*G06F 15/173* (2006.01)
*G06F 17/30* (2006.01)
*G06F 21/55* (2013.01)

(52) U.S. Cl.
CPC ........ *G06F 17/30516* (2013.01); *G06F 21/554* (2013.01)

(58) Field of Classification Search
CPC ... H04L 47/00; H04L 12/585; H04L 27/2334; H04L 29/06578
USPC ............... 709/225, 200, 239, 232; 726/13, 30
See application file for complete search history.

(56) References Cited

U.S. PATENT DOCUMENTS

| | | | | |
|---|---|---|---|---|
| 5,910,987 | A * | 6/1999 | Ginter et al. ..................... | 705/52 |
| 6,092,110 | A * | 7/2000 | Maria et al. .................... | 709/225 |
| 6,243,815 | B1 * | 6/2001 | Antur et al. ..................... | 726/11 |
| 6,772,346 | B1 * | 8/2004 | Chess et al. ..................... | 716/13 |
| 6,976,070 | B1 * | 12/2005 | Hoashi et al. ................. | 709/224 |
| 6,983,323 | B2 * | 1/2006 | Cantrell et al. ............... | 709/225 |
| 7,359,962 | B2 * | 4/2008 | Willebeek-LeMair et al. ................ | 709/223 |
| 7,433,349 | B2 * | 10/2008 | Liu et al. ........................ | 370/351 |
| 7,747,693 | B2 * | 6/2010 | Banister et al. ............... | 709/206 |
| 7,941,515 | B2 * | 5/2011 | Ladd et al. .................... | 709/223 |
| 8,166,535 | B2 * | 4/2012 | Coburn .......................... | 726/11 |
| 8,312,533 | B2 * | 11/2012 | Price .............................. | 726/15 |

(Continued)

OTHER PUBLICATIONS

Irwin, Barry, "Reclaiming one's bandwidth: Dynamic filtering of traffic based on packet payload content," Jun. 2000, Rhodes University, Grahamstown, South Africa.*

*Primary Examiner* — El Hadji Sall
(74) *Attorney, Agent, or Firm* — Polsinelli PC (57) ABSTRACT

A computer-based system for regulating entry of data into a protected system. The system can include a first processor configured to process and manage data for the computer-based system. The system can also include one or more indelible memories communicatively linked with the first processor for the computer-based system. Additionally, the system can include a second processor configured to process and manage data for the protected system, wherein the second processor for the protected system is communicatively linked to the first processor for the computer-based system. The first processor for the computer-based system can be configured to receive one or more parameters from the second processor, wherein the one or more parameters defines which data from a data stream can pass to the protected system. Also, the first processor can be configured to receive the data stream from one or more accessing systems The first processor can be further configured to filter the data stream based on the one or more parameters received from the second processor. Moreover, the first processor can be configured to transmit the filtered data stream to the second processor, wherein one or more of the receiving, the filtering, and the transmitting is performed by utilizing the one or more indelible memories.

34 Claims, 6 Drawing Sheets

(56) References Cited

U.S. PATENT DOCUMENTS

| | | | |
|---|---|---|---|
| 8,397,276 B2* | 3/2013 | March et al. | 726/3 |
| 8,590,016 B2* | 11/2013 | Kim et al. | 726/4 |
| 2003/0172291 A1* | 9/2003 | Judge et al. | 713/200 |
| 2003/0229810 A1* | 12/2003 | Bango | 713/201 |
| 2004/0268147 A1* | 12/2004 | Wiederin et al. | 713/201 |
| 2005/0086512 A1* | 4/2005 | Lee et al. | 713/200 |
| 2008/0201772 A1* | 8/2008 | Mondaeev et al. | 726/13 |
| 2009/0112974 A1* | 4/2009 | Ravikumar et al. | 709/203 |
| 2010/0114963 A1* | 5/2010 | Brumfield | 707/783 |

* cited by examiner

METHOD AND SYSTEM FOR REGULATING ENTRY OF DATA INTO A PROTECTED SYSTEM

FIELD OF THE INVENTION

The present invention is related to the fields of computer data processing, and security, and more particularly, to computer-based systems and methods for recovering synchronized and secure distributed medical information by web-oriented pooling.

BACKGROUND OF THE INVENTION

As individuals and businesses increasingly rely on computer systems for managing information and data, such systems face an ever-increasing risk of intrusion and infection that can be perpetrated by various forms of malware. Malware typically includes viruses, exploits, worms, Trojan horses, spyware, and other forms of malicious software intended to comprise or gain access to a particular computer system. For example, a transmitted image or other file can contain embedded malware, which can later infect a system through the system's security holes. As a result, it is absolutely critical to maintain defenses against malware, particularly in systems with access to highly sensitive data. In order to prevent and identify intrusions by malware, computer systems often utilize antivirus software, firewalls, and other security measures. Existing security measures are often effective at providing some level of protection for systems, however, such measures often have to be updated frequently, expire, are susceptible to attacks themselves, cannot filter incoming data in stream, or cannot be customized to adapt to systems with varying security capabilities. This invariably leads to gaps in security and to levels of protection that are not high enough to satisfy security needs.

As a result, there is a need for more effective and efficient means for regulating the entry of data into computer systems to ensure a greater level of protection against unauthorized intrusions. Furthermore, there is a need for effective and efficient systems and methods for providing a perimeter system with parameters for filtering data from incoming data streams prior to transmittal to a protected system.

SUMMARY OF THE INVENTION

The present invention is directed to systems and methods for regulating the entry of data and information into a protected system based upon parameters defined by the protected system.

One embodiment of the invention is a computer-based system for regulating entry of data into a protected system. The system can include a first processor configured to process and manage data for the computer-based system. The system can also include one or more indelible memories communicatively linked with the first processor for the computer-based system. Additionally, the system can include a second processor configured to process and manage data for the protected system, wherein the second processor for the protected system is communicatively linked to the first processor for the computer-based system. The first processor for the computer-based system can be configured to receive one or more parameters from the second processor, wherein the one or more parameters defines which data from a data stream can pass to the protected system. Also, the first processor can be configured to receive the data stream from one or more accessing systems. The first processor can be further configured to filter the data stream based on the one or more parameters received from the second processor. Moreover, the first processor can be configured to transmit the filtered data stream to the second processor, wherein one or more of the receiving, the filtering, and the transmitting is performed by utilizing the one or more indelible memories.

Another embodiment of the invention is a computer-based method for regulating entry of data into a protected system. The method can include receiving at a perimeter system one or more parameters from the protected system, wherein the one or more parameters defines which data from a data stream can pass to the protected system. Also, the method can include receiving the data stream from one or more accessing systems. The method can further include filtering the data stream based on the one or more parameters received from the protected system. Moreover, the method can include transmitting the filtered data stream to the protected system, wherein one or more of the receiving, the filtering, and the transmitting steps is performed by utilizing an indelible memory.

Yet another embodiment of the invention is a computer-readable medium which contains computer-readable code that when loaded on a computer causes the computer to receive at a perimeter system one or more parameters from a protected system, wherein the one or more parameters define which data from a data stream can pass to the protected system, to receive the data stream from one or more accessing systems to filter the data stream based on the one or more parameters received from the protected system, and to transmit the filtered data stream to the protected system, wherein one or more of the receiving, the filtering, and the transmitting steps is performed by utilizing indelible memory.

BRIEF DESCRIPTION OF THE DRAWINGS

There are shown in the drawings, embodiments which are presently preferred. It is expressly noted, however, that the invention is not limited to the precise arrangements and instrumentalities shown.

DETAILED DESCRIPTION

Figure 1:
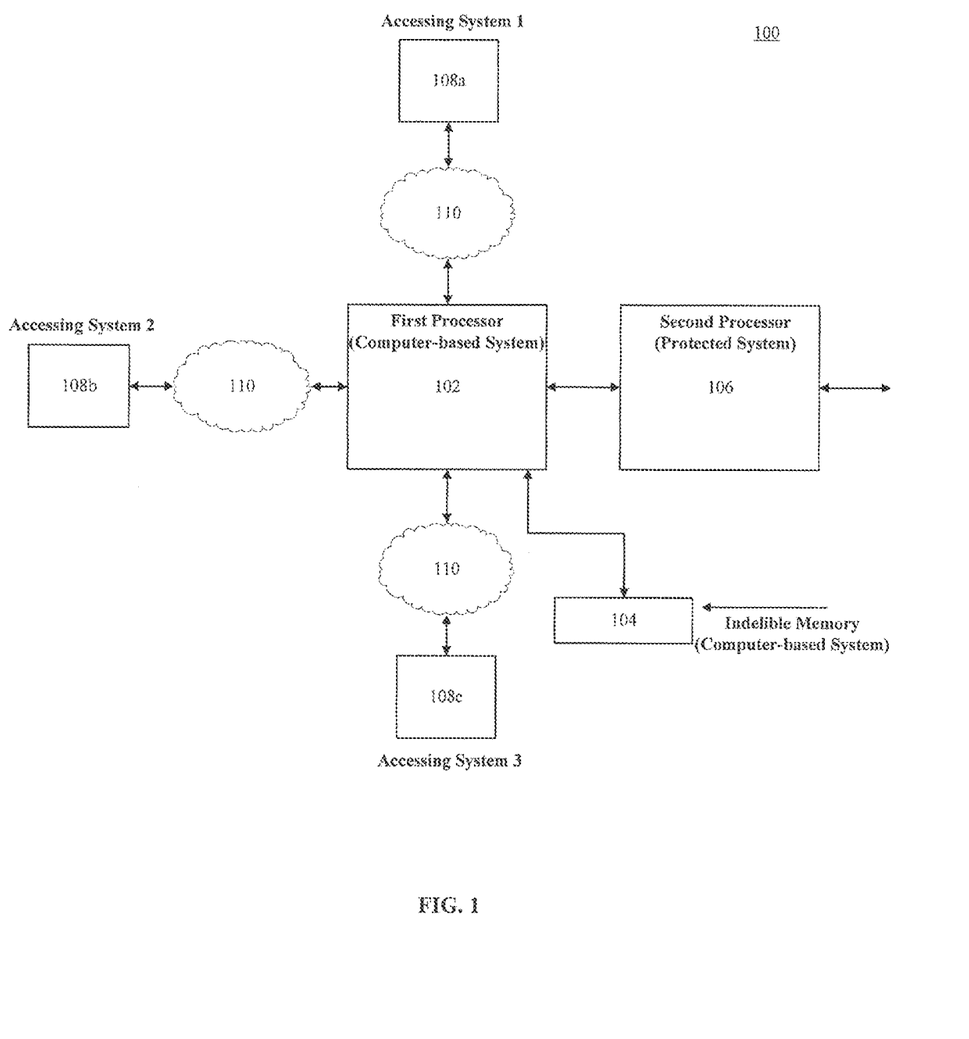
FIG. 1 is a schematic view of a system for regulating entry of data into a protected system, according to one embodiment of the invention.

Referring initially to FIG. 1, a system 100 for regulating entry of data into a protected system, according to one embodiment of the invention, is schematically illustrated. The system can include a first processor 102 configured to process and manage data for a computer-based system, which can also be known as a perimeter system. Additionally, the system 100 can include one or more indelible memories 104 communicatively linked with the first processor 102 for the computer-based system. The system 100 can also include a second processor 106 configured to process and manage data for a protected system, wherein the second processor for the protected system is communicatively linked to the first processor 102 for the computer-based system. Furthermore, the system 100 can include one or more accessing systems 108a-c. Although one first processor 102, one indelible memory 104, one second processor 106, and three accessing systems 108a-c are shown, it will be apparent to one of ordinary skill that a greater number of first processors, indelible memories, second processors and a greater or lesser number of accessing systems can be utilized in the system 100.

The first processor 102 and second processor 106 can be implemented in hardwired, dedicated circuitry for performing the operative functions described herein. In another embodiment, the first processor 102 and second processor 106 can be implemented in computer-readable code configured to execute on a particular computing machine. In yet another embodiment, however, the first processor 102 and second processor 106 can be implemented in a combination of hardwired circuitry and computer-readable code.

Operatively, the first processor 102 for the computer-based system can be configured to receive one or more parameters from the protected system via the second processor 106. The first processor 102 can also receive a data stream from the one or more accessing systems 108a-c. Notably, the one or more parameters received from the second processor 106 can define which data from the data stream can pass to the protected system. Additionally, the first processor 102 can be configured to filter the data stream based on the one or more parameters received from the second processor 106. Filtering can include, but is not limited to, rejecting, altering, and conforming data in response to the parameters. The first processor 102 can filter, but is not limited to filtering, strings of ASCII characters or other characters, text, graphics, scripts, and computer code contained within various files and/or data streams. After filtering the data stream, the first processor 102 can transmit the filtered data stream to the protected system. One or more of the receiving, the filtering and the transmitting of the first processor 102 can be performed by utilizing the indelible memory 104.

According to a particular embodiment, the one or more parameters can define one or more among a data field, a data length, a permissible character and/or data, a format, a data type, and an organizational structure associated with the data in the data stream. For example, the second processor 106 can define in a parameter that no control characters are permissible for a particular data field and that the maximum data length for a particular field can be no greater than fifty characters. Also, the computer-based system and one or more of an operating system and an application of the computer-based system can operate from the one or more indelible memories 104. It is important to note that the computer-based system, the operating system and the application can, in an embodiment, run only from indelible memory. Notably, the one or more indelible memories can comprise, but is not limited to, one or more among a read-only memory (ROM), a write-protected random-access memory (RAM), a secure flash memory, a CD-ROM, non-volatile memory, and a DVD-ROM.

Figure 2:
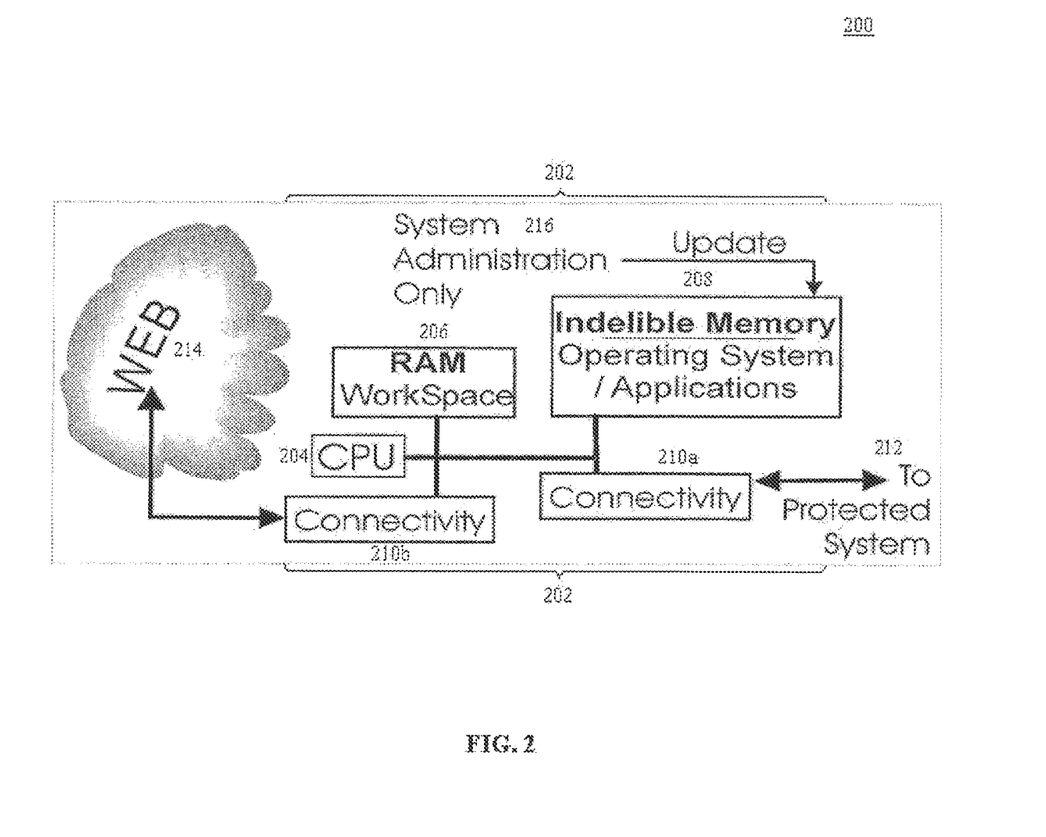
FIG. 2 is a schematic view of a computer-based system according to an embodiment of the invention.

In another embodiment, the first processor 102 for the computer-based system can be configured to update the function of the computer-based system and/or the operating system of the computer-based system, but only by system administration. By only allowing system administration to alter the functions or the operating system of the computer-based system, it serves as a strong defense against intrusions. Referring now also to FIG. 2, a schematic view 200 of a computer-based system 202 according to an embodiment of the system 100, is illustrated. The computer-based system 202 can include a central processing unit (CPU) 204 communicatively linked with a workspace of registers and/or RAM 206, and an indelible memory 208. While the computer based system 202 includes a workspace of registers and/or RAM 206, it is important to note that the operating system of the computer-based system 202 does not allow code to be executed from this space.

A protected system 212 can send one or more parameters to the computer-based system 202 via connectivity point 210a. The one or more parameters can define what data from a data stream can pass to the protected system 212. An accessing system (not explicitly shown) can access the computer-based system 202 and feed a data stream through the Internet/web 214 to the computer-based system 202 via connectivity point 210b. The computer-based system 202 resists intrusion by causing applications and the operating system of the computer-based system 202 to operate from the indelible memory 208. By operating from the indelible memory 208, the computer-based system 202 can receive, filter, and transmit data securely. As a further security measure, updates and changes to the operating system can only be conducted by utilizing system administration 216.

According to another embodiment, the first processor 102 for the computer-based system can be configured to filter the data stream by rejecting data from the data stream if the data does not conform to the one or more parameters received from the second processor 106. In yet another embodiment, the first processor 102 for the computer-based system can be configured to filter the data stream by converting data from the data stream that does not conform to the one or more parameters to an acceptable form. For example, if a parameter defines that control characters are impermissible characters, then the first processor 102 can convert any encountered control characters to the nearest non-control character and then transmit the data to the protected system. In another embodiment, the first processor 102 can be configured to send an alert to the second processor 106 and/or accessing systems 108a-c upon filtering data from the data stream or upon detecting data from the data stream which does not conform to the parameters. The alert can indicate, but is not limited to indicating, which data from the data stream has been filtered or that data has been filtered.

Figure 3:
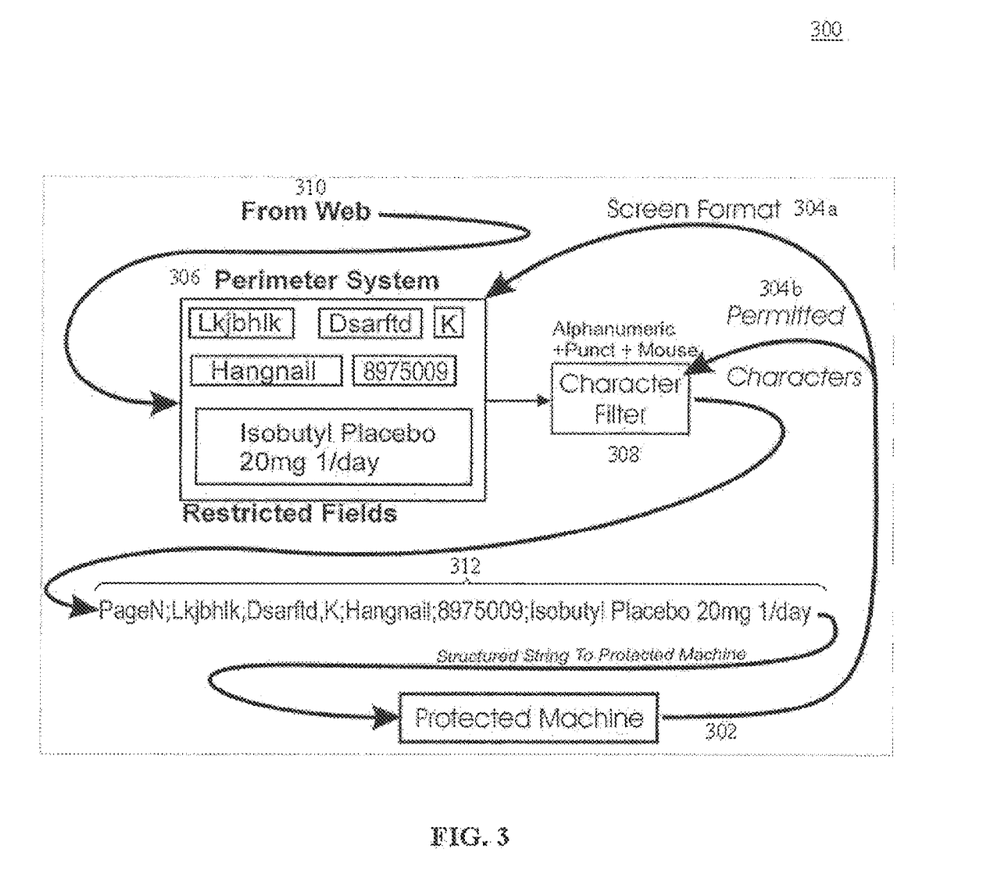
FIG. 3 is an illustration depicting the operation of the system as it relates to the screening of incoming text data.

Referring now also to FIG. 3, an illustration depicting the operation of a system 300 as it relates to the screening of incoming text data is provided. The system 300 includes a protected system 302, which specifies and transmits parameters including an expected screen format 304a to a perimeter system (computer-based system) 306 and permitted characters 304b to a character filter 308 communicatively linked to the perimeter system 306. The fields depicted in the screen format 304a can be fixed in format, much like paper coding form, such that any excess data entered into a field is discarded to avoid buffer overflows. Buffer overflows can cause errors and possible entry points for intrusive malware. An accessing system (not explicitly shown) can enter text data into the fields specified in the screen format 304a and the text data can be transmitted to the perimeter system 306 via the Internet/web 310. The perimeter system 306 and character filter 308 inspect and filter the text data to ensure the data conforms to the parameters. If any characters do not conform to the parameters, the text data can be rejected or converted to an acceptable form. Once filtered, the text data can be arranged into a structured string 312 and transmitted to the protected system 302.

Figure 4:
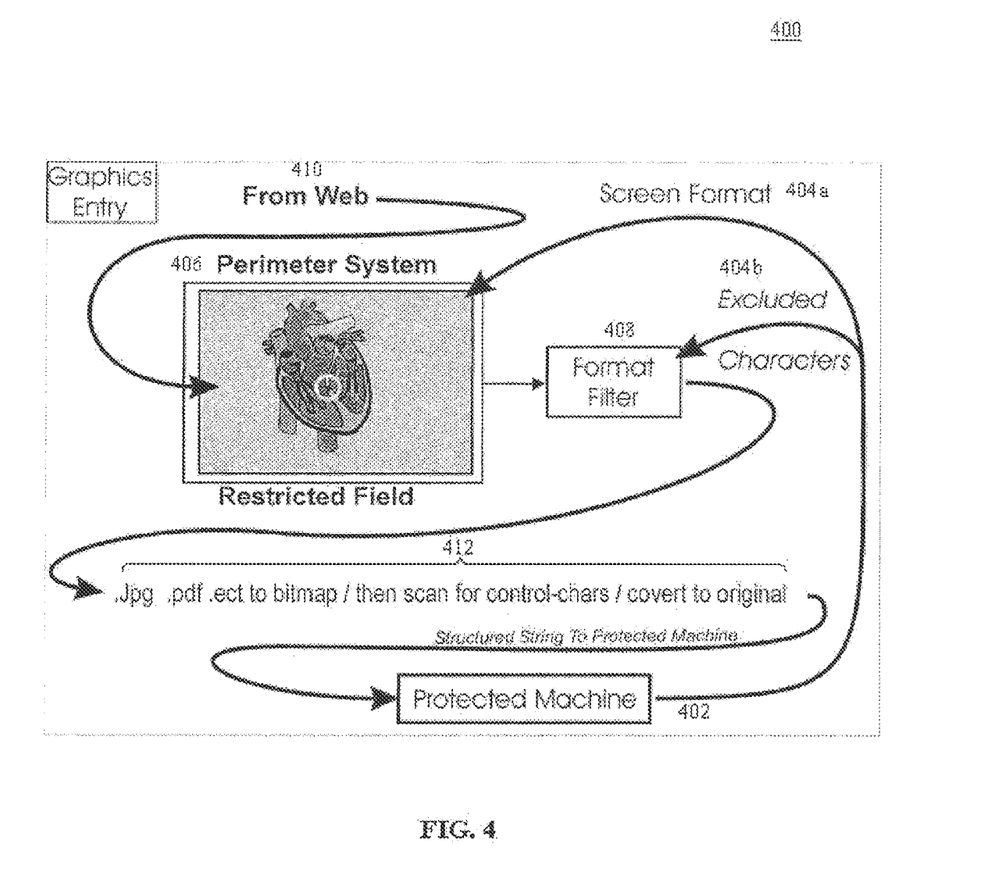
FIG. 4 is an illustration depicting the operation of the system as it relates to the filtering of incoming graphic data.

Referring now also to FIG. 4, an illustration depicting the operation of a system 400 as it relates to the filtering of incoming graphic data is provided. The operation of the system 400 as it relates to handling graphic data is much like the operation of the system 300 as it relates to incoming text data. The system 400 includes a protected system 402, which specifies and transmits parameters including a screen format 404a to a perimeter system (computer-based system) 406 and excluded characters 404b to a format filter 408 communicatively linked to the perimeter system 406. An accessing system (not explicitly shown) can transmit graphic data to the perimeter system 406 via the Internet/web 410. In order to filter the graphic data, the perimeter system 406 can convert the received image format to a bitmap and scan the bitmap for control characters or excluded characters 404b. If any undesired characters 404b are found, the perimeter system 406 can convert the undesired characters into the nearest non-control character and then reconvert the bitmap to the original format. By eliminating undesired characters and strings, it allows the protected system 402 to avoid being infected and can also help the protected system 402 from infecting other systems. The graphic data can then be transmitted to the protected system 402 in a structured format 412.

In order to further illustrate the capabilities provided by the invention, the following example, which includes a portion of a sample computer program, is provided. The portion of the computer program, which in this case is written in VB.NET programming language and can be configured to execute on the first processor 102, can be utilized to open an image file as if it was a text file. The program can inspect and read the image file for any "coherent" text strings (i.e. consecutive text characters within the body of the image) and/or malicious code strings. The intent is to locate all text strings as a first step toward identifying any embedded and potentially malicious client-side scripting code. Finally, the program can return a listing of all of these potentially harmful text strings, based on a minimum length criterion (i.e. strings containing a minimum number of characters are returned).

First, the image file can be loaded into memory and "read" as a single string of text characters. This string is then parsed into an array of bytes so that the file content can be inspected, one character at a time. Example code is provided as follows:
Dim fileContentsT As String=My.Computer.FileSystem.ReadAllText(fullFilePath)
Dim bytes As Byte( )=System.Text.Encoding.ASCII.GetBytes(fileContentsT)

Second, the logic iterates ("loops") through each byte element in the array, determining whether its value falls within the range for acceptable text characters. Example code, along with accompanying comments, is provided as follows:

```
For Each bit As Byte In bytes
  CheckByte(bit)
Next
Private Sub CheckByte(ByVal bit As Byte)
  Dim chr As Char = ChrW(bit)
  'this SELECT-CASE block implements a very simple state machine
  'to check for consecutive characters (strings)
  Select Case fs 'file state enumeration
    Case FileState.fsClean
      If Char.IsLetter(chr) Then
        fs = FileState.fsCharFound
        AddCharToBuffer(chr)
      End If
    Case FileState.fsCharFound
      If ByteIsInString(chr) Then
        AddCharToBuffer(chr)
        If intBufferCount = MIN_CHARS_IN_STRING Then
          'enter string capture state
          fs = FileState.fsStringFound
            'set public flag - strings were found!
          boolHasStringsInFile = True
        End If
      Else
        'revert back to default state
        fs = FileState.fsClean
        ResetBuffer( )
      End If
    Case FileState.fsStringFound
      If Not (ByteIsInString(chr)) Then
        alStrings.Add(strBuffer.ToString)
        ResetBuffer( )
        fs = FileState.fsClean
          Else
        AddCharToBuffer(chr)
      End If
  End Select
End Sub
```

The program's state can change whenever valid text characters are identified during the iteration. The program, for example, can be in one of three states at any given time. A first state can be a "clean state," which can indicate that no characters have recently been detected. A second state can be a "chars found state," which can indicate that one or more consecutive characters were found immediately before the byte currently being inspected. This can indicate that the current set of characters constitutes a potential string. A third state can be a "string found state," which can indicate that a set of consecutive characters, of a pre-defined minimum length, was found immediately prior to the current byte. Thus, the program can recognize the current character set as a string. Whenever a string is identified, it can be added to an array of strings found in the image file. The complete list of strings can be returned at the end of the iteration.

According to another embodiment of the invention, the one or more accessing systems 108a-c can be a plurality of accessing systems, and wherein a first portion of the plurality of accessing systems belongs to a first class, wherein the first portion belonging to the first class is more robust against intrusion than another portion of the plurality of accessing systems belonging to a second class. In yet another embodiment, the computer-based system can be a plurality of computer-based systems, and wherein a first portion of the plurality of computer-based systems belongs to the first class and another portion of the plurality of computer-based systems belongs to the second class. It is important to note that an infinite number of classes can exist, each capable of having different security capabilities from another. A more robust class can mean that systems belonging to the class can have a greater number of parameters associated with it, more tightly restricted parameters, a greater number of security applications and features, and more powerful security applications and features.

In still another embodiment, the first processor 102 for the computer-based system can be configured to maintain a list of valid accessing systems of the at least one accessing system, wherein the first processor determines whether an accessing system of the at least one accessing system can access the first processor based on whether the accessing system is in the list. For example, if accessing system 108a attempts to access the computer-based system and the accessing system 108a is not in the list, the computer-based system can prohibit accessing system 108a from accessing the computer-based system. This serves as a security measure to prevent unauthorized access of the protected system.

Figure 5:
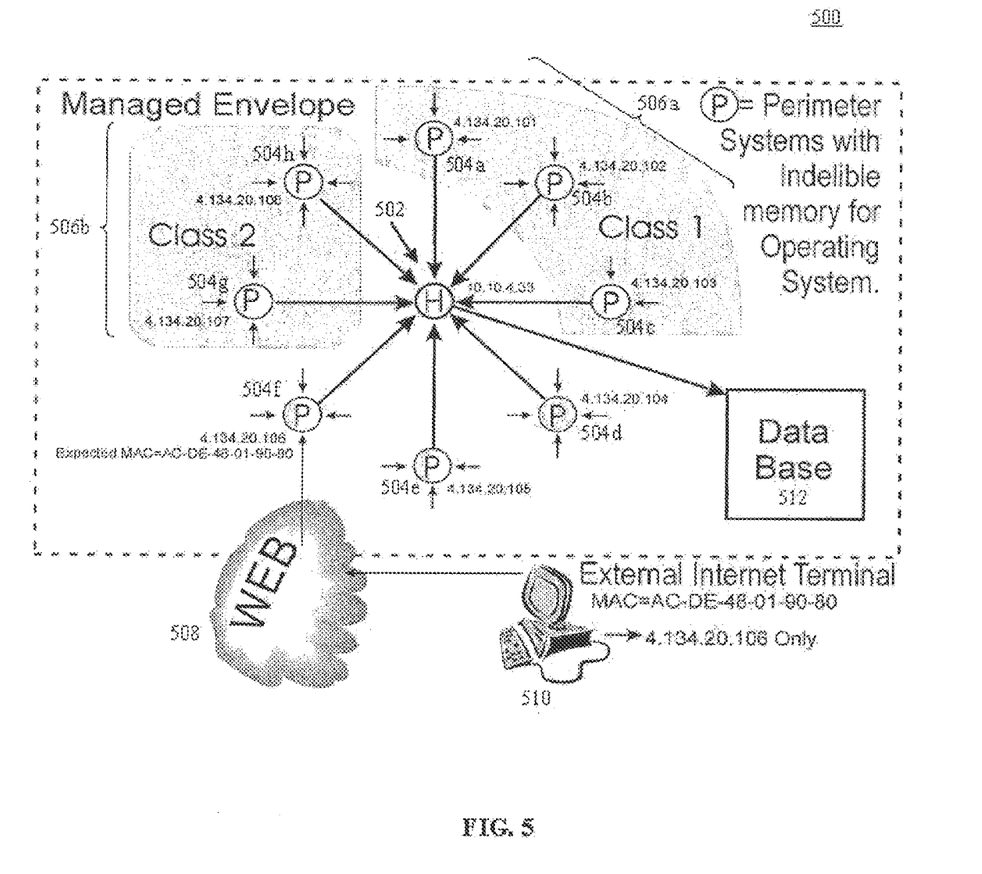
FIG. 5. is a schematic view of a protected system surrounded by a group of perimeter systems belonging to different classes, according to one embodiment of the invention.

Referring now also to FIG. 5, a schematic view of a system 500 including a protected system surrounded by a group of perimeter systems belonging to different classes is illustrated. The system 500 can include a protected system 502 surrounded by perimeter systems 504a-h. The protected system 502 can have an address, such as 10.10.4.33, that is invisible to the Internet/web 508 and external systems, such as external terminal 510. Having such an invisible address can help to protect external systems from accessing sensitive data contained in a database 512 accessible by the protected system 502 The perimeter systems 504a-h can operate from indelible memory and can have addresses, which, in this case, conform to 4.124.20.10X. These perimeter systems 504a-h can be accessed by external systems and serve as a barrier to entry to protected system 502. External systems and the perimeter systems 504a-h can belong to different classes, which can have varying abilities to withstand intrusion and infection from malware. For example, perimeter systems 504a-c and external systems that access perimeter systems 504-a-c can belong to a Class 1 506a and perimeter systems 504g-h and external systems that access perimeter systems 504g-h can belong to Class 2 506b. In this example, Class 1 may be more robust against intrusion than Class 2. Systems belonging to Class 1 may have stronger security capabilities and more stringent parameters associated with them than systems belonging to Class 2.

If external terminal 510 has a Media Access Control (MAC) address of AC-DE-48-01-90-80, and external terminal 510 tries to access one of the perimeter systems 504a-h, the external terminal 510 may be rejected if the MAC address for external terminal 510 is not found in a list maintained by one of the perimeter systems 504a-h. Assuming perimeter system 504f maintains the MAC address of external terminal 510 in its list, it will allow external terminal 510 to access and transmit data to perimeter system 504f. From here, perimeter system 504f can filter any data that does not conform to the parameters provided by protected system 502 and then transmit the filtered data to the protected system 502.

Figure 6:
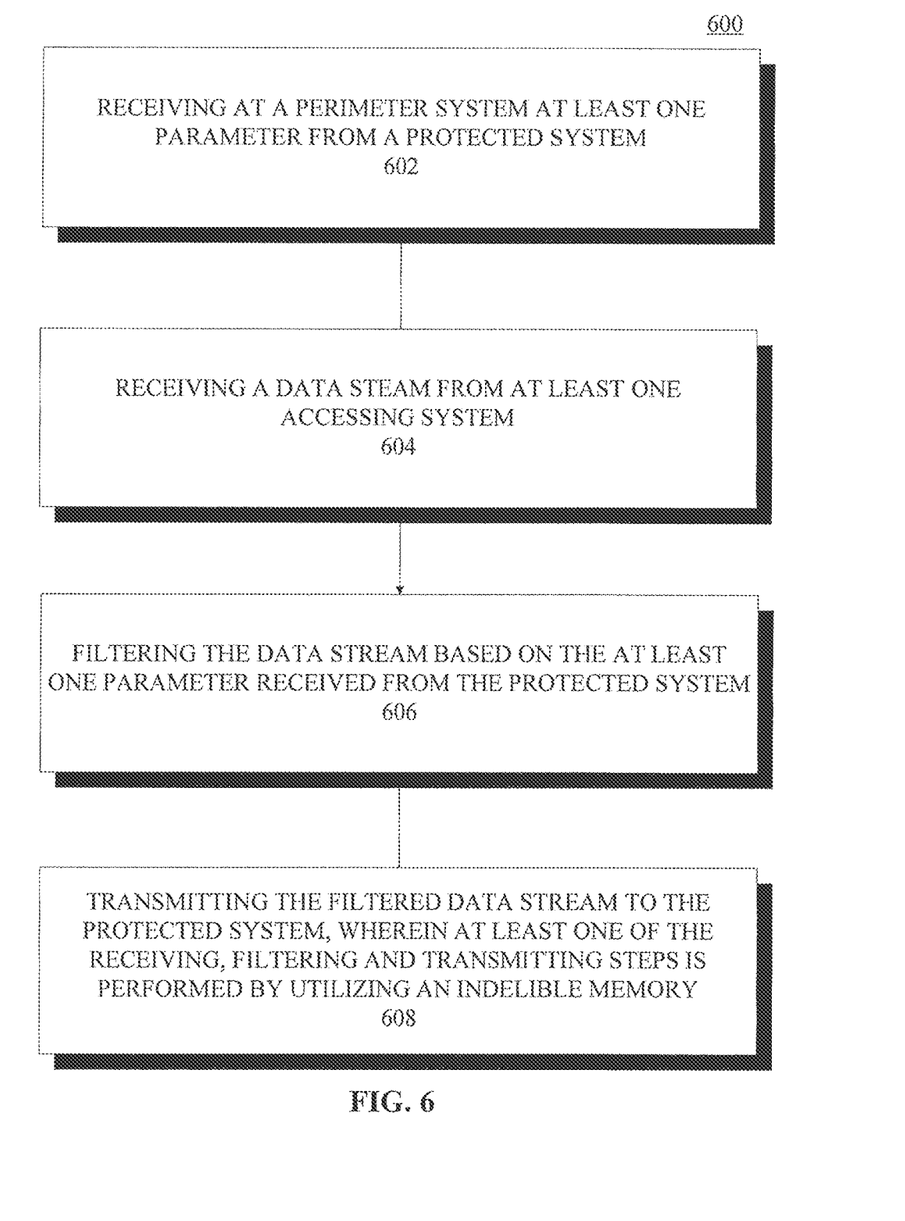
FIG. 6 is a flowchart of steps in a method for regulating entry of data into a protected system, according to another embodiment of the invention.

Referring now to FIG. 6, a flowchart is provided that illustrates certain method aspects of the invention. The flowchart depicts steps of a method 600 for regulating entry of data into a protected system. The method 600 illustratively starts at step 602 and can include receiving at a perimeter system one or more parameters from the protected system, wherein the one or more parameters define which data from a data stream can pass to the protected system. Also, the method 600 can include receiving the data stream from one or more accessing systems at step 604. The method 600 can further include filtering the data stream based on the one or more parameters received from the protected system at step 606. Moreover, the method 600 can include, at the ending step 608, transmitting the filtered data stream to the protected system, wherein one or more of the receiving, the filtering, and the transmitting steps is performed by utilizing an indelible memory.

According to one embodiment, the one or more parameters can define one or more among a data field, a data length, a permissible character, a format, and an organizational structure associated with the data in the data stream. For example, a parameter can define that only images conforming to .JPG format are allowed to pass to the protected system. In another embodiment, the perimeter system and one or more of an operating system and an application of the perimeter system operate from the indelible memory. The indelible memory can comprise one or more among a read-only memory (ROM), a write-protected random-access memory (RAM), a secure flash memory, a CD-ROM, non-volatile memory, and a DVD-ROM. In one embodiment, the method 600 can include updating one or more of a function and the operating system of the perimeter system only by system administration.

In yet another embodiment, the method 600 can include at the filtering step 604 rejecting data from the data stream if the data does not conform to the one or more parameters. The method 600 can further include at the filtering step 606 converting data from the data stream that does not conform to the one or more parameters to an acceptable form. It is important to note that the filtering step 606 is not limited to rejecting or converting data, but can also encompass other forms of filtering. In another embodiment, the method 600 can include providing an alert to the protected system and/or accessing system upon filtering data from the data stream or upon detecting data from the data stream which does not conform to the parameters. The alert can indicate, but is not limited to indicating, which data from the data stream has been filtered or that data has been filtered.

According to another embodiment, the one or more accessing systems can be a plurality of accessing systems, wherein a first portion of the plurality of accessing systems belongs to a first class, wherein the first portion belonging to the first class is more robust against intrusion than another portion of the plurality of accessing systems belonging to a second class. In another embodiment, the perimeter system can be a plurality of perimeter systems, and wherein a first portion of the plurality of perimeter systems belongs to the first class and another portion of the plurality of perimeter systems belongs to the second class.

The method 600 can also include maintaining a list of valid accessing systems at the perimeter system and wherein the perimeter system determines whether an accessing system of the at least one accessing system can access the perimeter system based on whether the accessing system is in the list. For example, if a particular accessing system tries to access the perimeter system and the accessing system is not a valid accessing system, the perimeter system can reject the accessing system. The method can further include detecting an intrusion from at least one accessing system and tagging the intrusion by associating a source address with the intrusion. The source address of the tagged intrusion can be archived as a prior intrusion attempt for alarming the perimeter system if the perimeter system detects another intrusion from the same source address, in which the perimeter system can block transfer or engage in additional testing on the accessing system.

The invention can be realized in hardware, software, or a combination of hardware and software. The invention can be realized in a centralized fashion in one computer system, or in a distributed fashion where different elements are spread across several interconnected computer systems. Any type of computer system or other apparatus adapted for carrying out the methods described herein is suitable. A typical combination of hardware and software can be a general purpose computer system with a computer program that, when being loaded and executed, controls the computer system such that it carries out the methods described herein.

The invention, as already mentioned, can be embedded in a computer program product, such as magnetic tape, an optically readable disk, or other computer-readable medium for storing electronic data. The computer program product can comprise computer-readable code, (defining a computer program) which when loaded in a computer or computer system causes the computer or computer system to carry out the different methods described herein. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The preceding description of preferred embodiments of the invention have been presented for the purposes of illustration. The description provided is not intended to limit the invention to the particular forms disclosed or described. Modifications and variations will be readily apparent from the preceding description. As a result, it is intended that the scope of the invention not be limited by the detailed description provided herein.

I claim:

1. A computer-based method for regulating entry of data into a protected system, the method comprising the steps of:
receiving at a perimeter system at least one parameter from the protected system, wherein the at least one parameter defines which data from a data stream can pass to the protected system, wherein the data comprises graphic data, and wherein the at least one parameter defines a screen format and excluded characters;
receiving the data stream from at least one accessing system;
converting the data in the data stream from a received format to a filtering format to yield reformatted data;
filtering the reformatted user data based on the at least one parameter received from the protected system to yield filtered data in which any instances of the excluded characters are converted to non-control characters;
reconverting the filtered data back to received format to generate a processed data stream; and,
transmitting the processed data stream to the protected system, wherein at least one of the receiving, the converting, the filtering, the reconverting and the transmitting steps is performed by utilizing an indelible memory.

2. The method of claim 1, wherein the at least one parameter further defines at least one among a data field, a data length, and an organizational structure associated with the data in the data stream.

3. The method of claim 1, wherein the perimeter system and at least one of an operating system and an application of the perimeter system operate from the indelible memory.

4. The method of claim 1, wherein the indelible memory comprises at least one among a read-only memory (ROM), a write-protected random-access memory (RAM), a secure flash memory, a CD-ROM, non-volatile memory, and a DVD-ROM.

5. The method of claim 3, further comprising updating at least one of a function and the operating system of the perimeter system only by utilizing system administration.

6. The method of claim 1, wherein the filtering step comprises rejecting at least a portion of the data from the data stream that does not conform to the at least one parameter.

7. The method of claim 1, wherein the filtering step comprises converting at least a portion of the data from the data stream that does not conform to the at least one parameter to an acceptable form.

8. The method of claim 1, wherein the at least one accessing system is a plurality of accessing systems, and wherein a first portion of the plurality of accessing systems belongs to a first class, wherein the first portion belonging to the first class is more robust against intrusion than another portion of the plurality of accessing systems belonging to a second class.

9. The method of claim 8, wherein the perimeter system is a plurality of perimeter systems, and wherein a first portion of the plurality of perimeter systems belongs to the first class and another portion of the plurality of perimeter systems belongs to the second class.

10. The method of claim 1, wherein the perimeter system maintains a list of valid accessing systems of the at least one accessing system and wherein the perimeter system determines whether an accessing system of the at least one accessing system can access the perimeter system based on whether the accessing system is in the list.

11. The method of claim 1, further comprising detecting an intrusion from at least one accessing system and tagging the intrusion by associating a source address with the intrusion.

12. The method of claim 11, wherein the source address of the tagged intrusion is archived as a prior intrusion attempt for alarming the perimeter system if the perimeter system detects another intrusion from the same source address, wherein the perimeter system blocks transfer or engages in additional testing on the accessing system and its data.

13. A computer-based system for regulating entry of data into a protected system, the computer-based system comprising:
a first processor configured to process and manage data for the computer-based system;
at least one indelible memory communicatively linked with the first processor for the computer-based system; and
a second processor configured to process and manage data for the protected system, wherein the second processor for the protected system is communicatively linked to the first processor for the computer-based system,
wherein the first processor for the computer-based system is configured to:
receive at least one parameter from the second processor, wherein the at least one parameter defines which data from the data stream can pass to the protected system, wherein the data comprises graphic data, and wherein the at least one parameter defines a screen format and excluded characters;
receive the data stream from at least one accessing system;
convert the data in the data stream from a received format to a filtering format to yield reformatted user data;
filter the reformatted user data based on the at least one parameter received from the protected system to yield filtered data in which any instances of the excluded characters are converted to non-control characters;
reconvert the filtered user data back to received format to generate a processed data stream; and,
transmit the processed data stream to the second processor, wherein at least one of the receiving, the converting, the filtering, the reconverting, and the transmitting is performed by utilizing the at least one indelible memory.

14. The system of claim 13, wherein the at least one parameter defines at least one among a data field, a data length, and an organizational structure associated with the data in the data stream.

15. The system of claim 13, wherein the computer-based system and at least one of an operating system and an application of the computer-based system operate from the at least one indelible memory.

16. The system of claim 13, wherein the at least one indelible memory comprises at least one among a read-only memory (ROM), a write-protected random-access memory (RAM), a secure flash memory, a CD-ROM, non-volatile memory and a DVD-ROM.

17. The system of claim 15, wherein the first processor for the computer-based system is configured to update at least one of a function and the operating system of the computer-based system only by utilizing system administration.

18. The system of claim 13, wherein the first processor for the computer-based system is configured to filter the data stream by rejecting at least a portion of the data from the data stream that does not conform to the at least one parameter.

19. The method of claim 13, wherein the first processor for the computer-based system is configured to filter the data stream by converting at least a portion of the data from the data stream that does not conform to the at least one parameter to an acceptable form.

20. The system of claim 13, wherein the at least one accessing system is a plurality of accessing systems, and wherein a first portion of the plurality of accessing systems belongs to a first class, wherein the first portion belonging to the first class is more robust against intrusion than another portion of the plurality of accessing systems belonging to a second class.

21. The system of claim 20, wherein the computer-based system is a plurality of computer-based systems, and wherein a first portion of the plurality of computer-based systems belongs to the first class and another portion of the plurality of computer-based systems belongs to the second class.

22. The system of claim 13, wherein the first processor for the computer-based system is configured to maintain a list of valid accessing systems of the at least one accessing system and wherein the first processor determines whether an accessing system of the at least one accessing system can access the first processor based on whether the accessing system is in the list.

23. A non-transitory computer-readable storage medium having stored therein computer-readable instructions, which, when loaded in and executed by a computer causes the computer to perform the steps of:
receiving at a perimeter system at least one parameter from a protected system wherein the at least one parameter defines which data from a data stream can pass to the protected system, wherein the data comprises graphic data, and wherein the at least one parameter defines a screen format and excluded characters;
receiving the data stream from at least one accessing system;
converting the data in the data stream from a received format to a filtering format to yield reformatted data;
filtering the reformatted user data based on the at least one parameter received from the protected system to yield filtered data in which any instances of the excluded characters are converted to non-control characters;
reconverting the filtered data back to received format to generate a processed data stream; and,
transmitting the processed data stream to the protected system, wherein at least one of the receiving, the converting, the filtering, the reconverting and the transmitting steps is performed by utilizing an indelible memory.

24. The non-transitory computer-readable storage medium of claim 23, wherein the at least one parameter defines at least one among a data field, a data length, and an organizational structure associated with the user data in the data stream.

25. The non-transitory computer-readable storage medium of claim 23, wherein the perimeter system and at least one of an operating system and an application of the perimeter system operate from the indelible memory.

26. The non-transitory computer-readable storage medium of claim 23, wherein the indelible memory comprises at least one among a read-only memory (ROM), a write-protected random-access memory (RAM), a secure flash memory, a CD-ROM, non-volatile memory, and a DVD-ROM.

27. The non-transitory computer-readable storage medium of claim 23, further comprising updating at least one of a function and the operating system of the perimeter system only by utilizing system administration.

28. The non-transitory computer-readable storage medium of claim 23, wherein the filtering step comprises rejecting at least a portion of the data from the data stream that does not conform to the at least one parameter.

29. The non-transitory computer-readable storage medium of claim 23, wherein the filtering step comprises converting at least a portion of the data from the data stream that does not conform to the at least one parameter to an acceptable form.

30. The non-transitory computer-readable storage medium of claim 23, wherein the at least one accessing system is a plurality of accessing systems, and wherein a first portion of the plurality of accessing systems belongs to a first class, wherein the first portion belonging to the first class is more robust against intrusion than another portion of the plurality of accessing systems belonging to a second class.

31. The non-transitory computer-readable storage medium of claim 30, wherein the perimeter system is a plurality of perimeter systems, and wherein a first portion of the plurality of perimeter systems belongs to the first class and another portion of the plurality of perimeter systems belongs to the second class.

32. The non-transitory computer-readable storage medium of claim 23, wherein the perimeter system maintains a list of valid accessing systems of the at least one accessing system and wherein the perimeter system determines whether an accessing system of the at least one accessing system can access the perimeter system based on whether the accessing system is in the list.

33. The non-transitory computer-readable storage medium of claim 23, further comprising detecting an intrusion from at least one accessing system and tagging the intrusion by associating a source address with the intrusion.

34. The non-transitory computer-readable storage medium of claim 33, wherein the source address of the tagged intrusion is archived as a prior intrusion attempt for alarming the perimeter system if the perimeter system detects another intrusion from the same source address, wherein the perimeter system blocks transfer or engages in additional testing on the accessing system and its data.

* * * * *